United States Patent [19]

Kaishio

[11] Patent Number: 5,779,286
[45] Date of Patent: Jul. 14, 1998

[54] PIPE JOINING CONSTRUCTION

[75] Inventor: Mitsuo Kaishio, Koga, Japan

[73] Assignees: ITT Automotive, Inc., Auburn Hills, Mich.; Sanoh Industrial Co., Ltd., Japan

[21] Appl. No.: 793,813

[22] PCT Filed: Aug. 30, 1995

[86] PCT No.: PCT/US95/10964

§ 371 Date: Feb. 26, 1997

§ 102(e) Date: Feb. 26, 1997

[87] PCT Pub. No.: WO96/07045

PCT Pub. Date: Mar. 7, 1996

[30] Foreign Application Priority Data

Aug. 31, 1994 [JP] Japan .................... 6-206160

[51] Int. Cl.$^6$ .................................................. F16L 17/00
[52] U.S. Cl. ........................................ 285/379; 285/319
[58] Field of Search ............................ 285/239, 260, 285/319, 379

[56] References Cited

U.S. PATENT DOCUMENTS 2,131,509  9/1938  Goepel et al. .
3,955,834  5/1976  Ahlrot .
4,603,890  8/1986  Nuppee .
5,135,268  8/1992  McNaughton et al. .
5,219,188  6/1993  Abe et al. .
5,261,709  11/1993  McNaughton et al. .

Primary Examiner—Dave W. Arola
Attorney, Agent, or Firm—Thomas N. Twomey; J. Gordon Lewis

[57] ABSTRACT

A pipe joining construction which maintains airtightness for a long period of time, easily ensures the required dimensional accuracy, and surface finish accuracy, and can decrease cost. The pipe joining construction is characterized by a seal member S mounted at the outer periphery of a male end form (2) on a connector (1) or a pipe M and a collar (5) covering the outer periphery of the tip end of the male end form (2). The collar (5) has a tapered portion with a tapered outer periphery. The collar (5) is used as a holding member for the seal member S. Alternately, a ring member (11) is mounted between the seal members and a bead (26) on the male end form (2).

18 Claims, 3 Drawing Sheets 5,779,286

PIPE JOINING CONSTRUCTION

BACKGROUND OF THE INVENTION

Field of the Invention and Related Art Statement

The present invention relates to a pipe or conduit joining construction in which a resin or polymeric pipe is fitted onto the outer periphery of a metallic male fitting portion or male end form to join the pipes. This pipe joining construction is suitable to pipes for transporting fluid, such as gasoline, oil, water, and air, from the fluid source side, such as a vessel or storage tank, to the fluid receiving side, such as motor vehicles and various machines and equipment.

One example of a conventional pipe joining construction is shown in FIG. 7. In this case, a male fitting portion 32 of a metallic connector 31, except for a tip end portion, has an outside diameter slightly larger than the inside diameter of a resin pipe P, and has a tapered portion 32a and a slip-out preventive ridge 32b at the tip end. The male fitting portion 32 is pressed into the end portion of the resin pipe P by which a seal is provided by using a tightening force of the resin pipe P which is elastically deformed by the pressing.

On the other end of the connector 31, a metallic pipe M is inserted. By this insertion, a locking claw 35 of a retainer R is engaged with a bead 34 formed at the outer periphery of the metallic pipe M. On the other hand, the edge of the female portion 33 of the connector 31 is folded back to the inside to provide a slip-out preventive piece 33a which engages a slip-out preventive piece receiving portion 36 on the retainer R. Thus, the resin pipe P and the metallic pipe M are joined to each other.

For the above-described pipe joining construction, airtightness is maintained only by the tightness of the resin pipe P. Therefore, when creep deformation of the resin pipe P occurs due to heat deterioration, the force for tightening the male fitting portion 32 decreases such that the airtightness cannot be maintained. Other factors which contribute to a lack of air tightness include variations in the size and tolerances of both pipes, the I.D. surface finish of the resin pipe, the O.D. surface finish of the metal pipe, the metal pipe weld seam, and the hardness of the resin pipe.

SUMMARY OF THE INVENTION

The present invention has been made to solve the above problems. Accordingly, it would be desirable to provide a pipe joining construction which maintains airtightness for a long period of time, easily ensures the dimensional accuracy and surface finish accuracy, improves cold temperature sealing, reduces permeation, improves sealing after exposure to heat, and can decrease costs.

To achieve this end, the present invention is characterized in that, in a pipe joining construction for connecting a resin or polymeric pipe to a metallic pipe by fitting the resin pipe onto the outer periphery of a metallic male fitting portion or end form, a seal member is mounted at the outer periphery of the male fitting portion of a connector and a collar covers the outer periphery of the tip end of the male fitting portion. The collar has a tapered portion with a tapered outer periphery. Further, the collar is used as a holding member for holding the seal member in place.

In another embodiment, the present invention is further characterized in that a ring is mounted at the outer periphery of the male fitting portion adjacent to the seal member at a position opposite to the collar. The present invention is also characterized in that a bead is formed at the male fitting portion, the ring is mounted adjacent to the seal member between the bead and the seal member, and the seal member is positioned and held between the collar and the ring.

The present invention, in which a seal member is mounted at the outer periphery of a metallic male fitting portion, the outer periphery of the tip end of the male fitting portion is covered by a collar, the collar has a tapered portion with a tapered outer periphery, and the collar is used as a holding member for the seal member, can maintain airtightness for a long period of time, and can easily ensure the required dimensional accuracy and surface finish accuracy.

The present invention offers the following effects.

In the invention, the seal member is mounted at the outer periphery of the metallic male fitting portion, the outer periphery of tip end of the male fitting portion is covered by the collar, the collar has the tapered portion with a tapered outer periphery, and the collar is used as a holding member for holding the seal member. Therefore, the tapered portion can be used in place of the tip end shape of the conventional metallic tube. Also, since the collar is used as a holding member for holding the seal member, airtightness can be maintained for a long period of time, and the required dimensional accuracy and surface finish accuracy can be easily ensured despite variations in the size, surface finish and hardness of one or both pipes.

In another embodiment of this invention, the ring is mounted at the outer periphery of the male fitting portion adjacent to the seal member at a position opposite to the collar. Therefore, the working accuracy of the male fitting portion has no effect on the sealing properties. In another embodiment of the invention, the bead is formed at the male fitting portion, the ring is mounted adjacent to the seal member between the bead and the seal member, and the seal member is positioned and held between the collar and the ring. Therefore, the working accuracy of the male fitting portion including the bead has no effect on the sealing properties.

DESCRIPTION OF THE PREFERRED EMBODIMENTS

Figure 1:
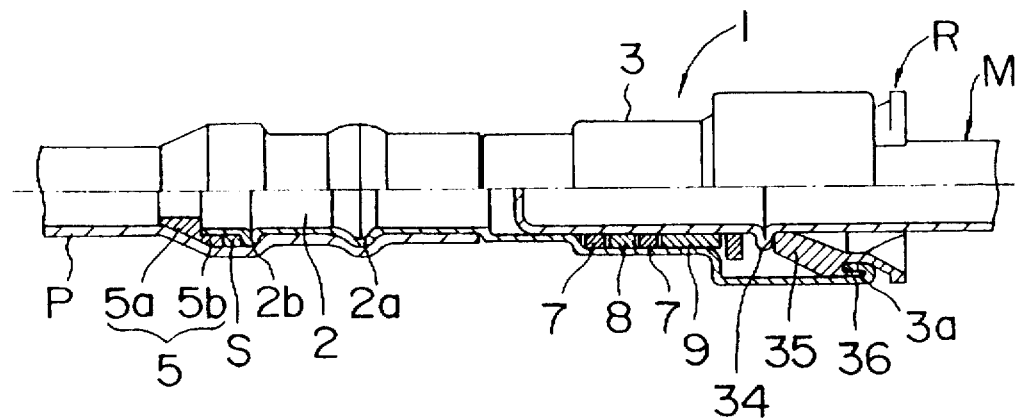
FIG. 1 is a partially cross sectioned, side elevational view showing a pipe joining construction in accordance with a first embodiment of the present invention.
Figure 7:
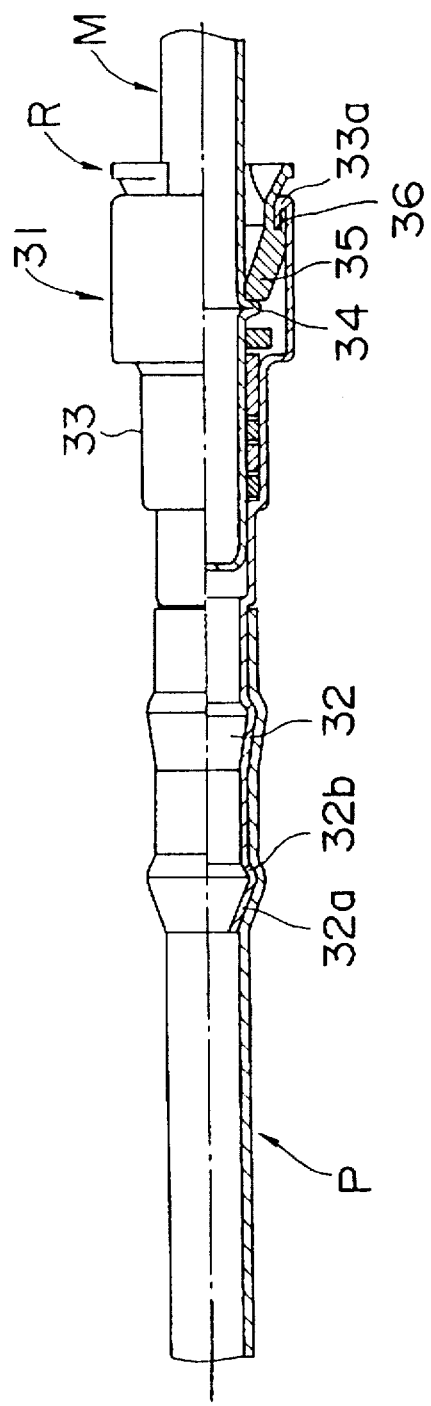
FIG. 7 is a partially cross sectioned, side elevational view showing a conventional pipe joining construction.

The embodiments of the present invention will be described in detail with reference to the drawings. In FIG. 1, a metallic pipe M, a resin or polymeric pipe P, and a retainer R are the same as the corresponding elements shown in FIG. 7. Therefore, the same reference numerals are applied to the same elements, and the detailed explanation of these elements is omitted.

In the pipe or conduit joining construction in accordance with a first embodiment, a seal member S is mounted at the outer periphery of a male fitting portion or end form 2 of a metallic connector 1 and a collar 5 is provided to cover the outer periphery of the tip end of the male fitting portion 2. In this pipe joining construction, the collar 5 is interposed between the outer periphery of the male fitting portion 2 and the inner periphery of the resin pipe P so that the collar 5 is used as a holding member for holding the seal member S.

The connector 1 integrally has the male fitting portion 2 fabricated into a spool and a female portion 3 having a diameter larger than that of the male fitting portion 2. A slip-out preventive ridge 2a and a bead 2b are formed on the male fitting portion 2. The annular seal member S is mounted at the outer periphery adjacent to the bead 2b, and the collar 5 is mounted on the tip end side adjacent to the seal member S to cover the outer periphery of the male fitting portion 2. The connector 1 does not have a tapered portion at the male fitting portion 2.

The connector 1 is provided with two O-rings 7, 7 disposed along the inner periphery of the female portion 3, a spacer 8 interposed between the O-rings 7, 7, a top hat 9 adjoining one O-ring 7, and a retainer R. The edge of the female portion 3 is folded back to the inside to form a slip-out preventive piece 3a.

The seal member S, being an O-ring made of NBR (nitrilebutadiene rubber), fluorine or silicon synthetic rubber, or the like, is mounted close to the bead 2b of the male fitting portion 2 and held in place by the collar 5 and the bead 2b.

The collar 5 made of synthetic resin, such as polyamide, polypropylene, and polyethylene, has an integral tapered portion 5a and a ring portion 5b. The ring portion 5b is fitted onto the outer periphery of the tip end of the male fitting portion 2 and a part of the tapered portion 5a protrudes from the tip end of the male fitting portion 2. The outer periphery of the tapered portion 5a is formed in such a manner as to be substantially the same as the tapered portion 32a of the conventional male fitting portion 32 shown in FIG. 7. The collar 5 not only covers the outer periphery of the tip end of the male fitting portion 2; but also is used as a holding member for holding the seal member S in place. An internal shoulder in the collar 5 abuts the tip end of the male fitting portion 2, as shown in FIGS. 1 and 2.

To join the pipes, the male fitting portion 2 having the seal member S and the collar 5 at the outer periphery of the tip end thereof is inserted into one end of a resin pipe P, and the tip end of a metallic pipe M is inserted into the female portion 3 of the connector 1. During the insertion of the metallic pipe M, a locking claw 35 of the retainer R is pressed and expanded within the range of elastic deformation until a bead 34 on the metallic pipe M reaches a position beyond the tip end of the locking claw 35. Thereupon, the locking claw 35 engages the bead 34 and a slip-out preventive piece receiving portion 36 abuts against the slip-out preventive piece 33a to prevent slipping out of the metallic pipe M from the resin pipe P. Thus, the resin pipe P and the metallic pipe M are joined to each other via the connector 1.

Figure 2:
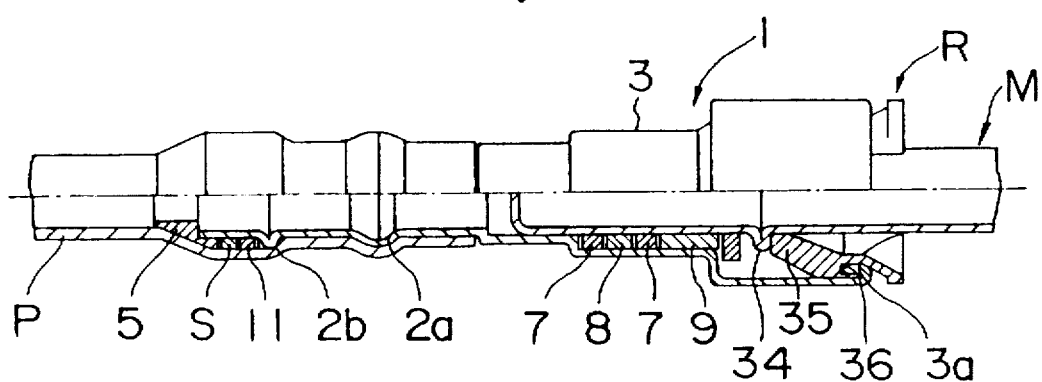
FIG. 2 is a partially cross sectioned, side elevational view showing a modification of the first embodiment of the present invention.

In FIG. 2, the same reference numerals are applied to the same elements shown in FIG. 1. In this modification, a ring 11 is disposed adjacent to the seal member S between the bead 2b and the seal member S. In this case, since the seal member S is positioned and held between the collar 5 and the ring 11, the working accuracy of the male fitting portion 2 including the bead 2b has no effect on the sealing properties of the pipe joint.

Figure 3:
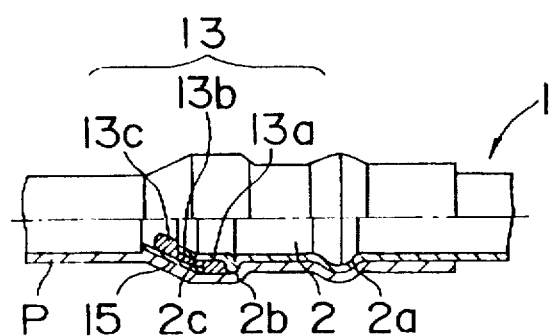
FIG. 3 is a partially cross sectioned, side elevational view showing another modification of the first embodiment of the present invention.

Further, as shown in another modification in FIG. 3, a tapered portion 2c at the tip end of the male fitting portion 2 may be covered by a cylindrical seal member 13 and a conical collar 15 may be fitted onto the outer periphery of the cylindrical seal member 13. The seal member 13 may be a cylindrical member, or it may be a member integrally formed by a portion 13a corresponding to an O-ring, a tapered portion 13b, and a tip end portion 13c protruding beyond the tapered portion 2c of the male fitting portion 2.

Figure 4:
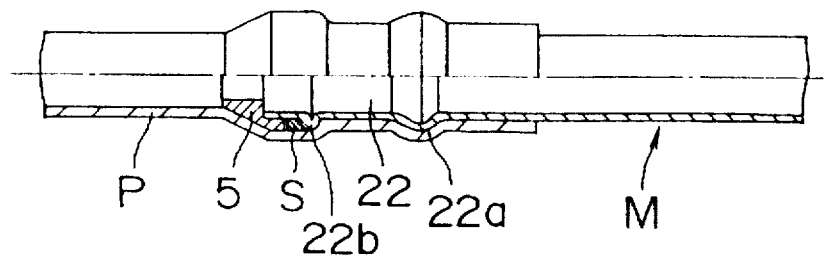
FIG. 4 is a partially cross sectioned, side elevational view showing a pipe joining construction in accordance with a second embodiment of the present invention.
Figure 5:
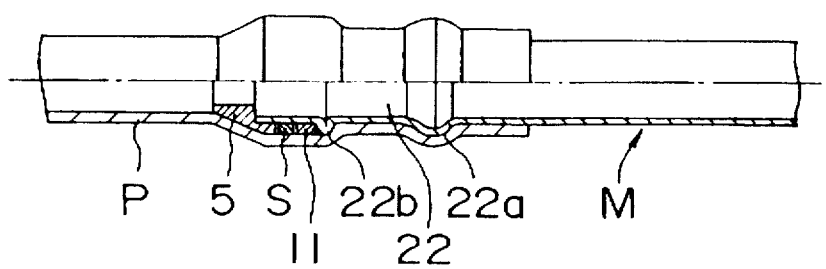
FIG. 5 is a partially cross sectioned, side elevational view showing a modification of the second embodiment of present invention.
Figure 6:
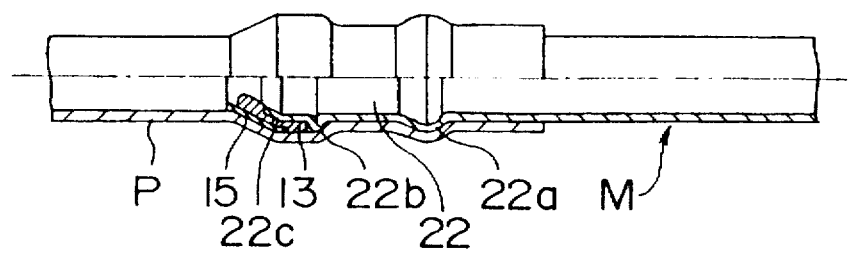
FIG. 6 is a partially cross sectioned, side elevational view showing another modification of the second embodiment of the present invention.

FIG. 4 to 6 are partially cross sectioned, side elevational views showing pipe joining constructions in accordance with a second embodiment of the present invention. In these pipe joining constructions, the connector 1 is omitted. A male fitting portion or end form 22 is formed at the tip end of the metallic pipe M, and the resin pipe P is directly fitted on the outer periphery of the male fitting portion 22 to join the resin or polymeric pipe P to the metallic pipe M.

The male fitting portion 22 has a slip-out preventive ridge 22a and a bead 22b. The male fitting portion 22 shown in FIG. 6 is formed with a tapered portion 22c. FIGS. 4, 5 and 6 correspond to FIGS. 1, 2 and 3, respectively. Therefore, the same reference numerals are applied to the same elements, and the explanation of the elements is omitted.

According to the second embodiment, since the working is easy, long pipes subjected to surface treatment, for example, automotive fuel pipes, can be joined, and the sealing properties can be maintained for a long period of time.

The present invention is not limited to the above embodiments, and can be modified variously without departing from the spirit and the scope of the invention. For example, a metal can be used in place of synthetic resin to form the collar, or the slip-out preventive ridge can be omitted in the case of low pressure.

I claim:

1. A pipe joining construction for joining pipes by fitting a polymeric pipe onto the outer periphery of a metallic male end form having a tip end comprising:

a seal member mounted on the outer periphery of the male end form; and a separate collar formed of a synthetic resin and mounted on the outer periphery of a tip end of the male end form, the collar having tapered portion with tapering outer periphery, the collar acting as a holding member for the seal member.

2. The pipe joining construction according to claim 1, wherein a ring is mounted at the outer periphery of the male end form adjacent to the seal member at a position opposite to the collar.

3. The pipe joining construction according to claim 2, wherein:

a bead is formed on the male end form;

the ring is mounted adjacent to the seal member between the bead and the seal member; and the seal member is positioned and held between the collar and the ring.

4. The pipe joining construction according to claim 1 wherein:

a bead is formed on the male end form; and the seal member is positioned adjacent the bead.

5. The pipe joining construction according to claim 1 wherein:

the male fitting portion is formed on a pipe insertable into the polymeric pipe.

6. The pipe joining construction according to claim 1 further comprising:

the male end form formed at a tip end of a connector, the connector having an opposed female portion, the male end form insertable into the polymeric pipe and the female portion receiving another pipe.

7. The pipe joining construction according to claim 6, wherein:

a bead is formed on the male end form of the connector;

a ring is mounted on the male end form adjacent to the seal member between the bead and the seal member; and the seal member is positioned and held between the collar and the ring.

8. The pipe joining construction according to claim 6 wherein:

a bead is formed on the male end form; and the seal member is positioned adjacent the bead.

9. The pipe joining construction according to claim 1, wherein:

the collar is formed of a synthetic resin.

10. A pipe joining construction for joining pipes by fitting a polymeric pipe onto the outer periphery of a metallic male end form comprising:

a seal member mounted on the outer periphery of the male end form; and a collar covering the outer periphery of a tip end of the male end form the collar having a tapered portion with a tapering outer periphery, the collar acting as a holding member for the seal member, the collar having an internal shoulder abutting a tip end of the male end form.

11. The pipe joining construction according to claim 10, wherein:

a bead is formed on the male end form;

the ring is mounted adjacent to the seal member between the bead and the seal member; and the seal member is positioned and held between the collar and the ring.

12. The pipe joining construction according to claim 10 wherein:

a bead is formed on the male end form; and the seal member is positioned adjacent the bead.

13. A pipe joining construction for joining pipes by fitting a polymeric pipe onto the outer periphery of a metallic male end form having a tip end formed with a tapered end portion comprising:

a seal member mounted over the tapered end portion of the male end form; and a collar covering an outer periphery of the seal member and the tip end of the male end form, the collar having tapered portion with a tapered outer periphery, the collar acting as a holding member for the seal member.

14. The pipe joining construction according to claim 13 wherein:

the seal member has an O-ring shaped end, an intermediate tapered portion, and a tip end portion.

15. The pipe joining construction according to claim 14 wherein:

the tip end portion of the seal member protrudes beyond the tapered end portion of the male end form.

16. The pipe joining construction according to claim 13 wherein:

a bead is formed on the male end form;

a ring is mounted adjacent to the seal member between the bead and the seal member; and the seal member is positioned and held between the collar and the ring.

17. The pipe joining construction according to claim 13 wherein:

a bead is formed on the male end form; and the seal member is positioned adjacent the bead.

18. A pipe joining construction for joining pipes by fitting a polymeric pipe onto the outer periphery of a metallic male end form having a tip end comprising:

a seal member mounted on the outer periphery of the male end form; and a separate collar mounted on the outer periphery of a tip end of the male end form, the collar having tapered portion with a tapering outer periphery, a portion of the tapered portion protruding axially from the tip end of the male end form, the collar acting as a holding member for the seal member.

* * * * *